United States Patent
Kersten et al.

(10) Patent No.: US 6,446,741 B1
(45) Date of Patent: Sep. 10, 2002

(54) ROCK DRILL

(75) Inventors: Heinrich Kersten, Verden; Hartmut Precht, Dinklage, both of (DE)

(73) Assignee: Gebrueder Heller Dinklage GmbH, Dinklage (DE)

(*) Notice: Subject to any disclaimer, the term of this patent is extended or adjusted under 35 U.S.C. 154(b) by 0 days.

(21) Appl. No.: 09/663,573

(22) Filed: Sep. 15, 2000

(30) Foreign Application Priority Data

Sep. 16, 1999 (DE) .......................... 199 44 406

(51) Int. Cl.[7] .......................... E21B 10/40; E21B 10/58
(52) U.S. Cl. ................. 175/428; 175/415; 175/420.1
(58) Field of Search .................. 175/415, 427, 175/428, 420.1

(56) References Cited

U.S. PATENT DOCUMENTS

| | | | | |
|---|---|---|---|---|
| 1,144,088 A | * | 6/1915 | Ains .......................... 408/59 |
| 1,899,458 A | * | 2/1933 | Erickson ...................... 279/20 |
| 2,673,714 A | * | 3/1954 | Hargrave ...................... 175/394 |
| 2,777,672 A | * | 1/1957 | Haglund et al. ............. 175/420.1 |
| 3,117,637 A | * | 1/1964 | Mortensen .................... 175/394 |
| 4,503,920 A | * | 3/1985 | Clement ....................... 175/394 |
| 4,595,322 A | * | 6/1986 | Clement ....................... 408/230 |
| 5,265,688 A | | 11/1993 | Rumpp et al. ................. 175/394 |
| 5,269,387 A | * | 12/1993 | Nance ......................... 175/420.1 |
| 5,273,380 A | * | 12/1993 | Musacchia .................... 408/230 |
| 5,287,937 A | * | 2/1994 | Sollami et al. |
| 5,400,861 A | * | 3/1995 | Sheirer ........................ 175/427 |
| 5,836,410 A | * | 11/1998 | Kleine ......................... 175/415 |
| 5,957,635 A | | 9/1999 | Nuzzi et al. |
| 6,021,857 A | * | 2/2000 | Birk et al. .................... 175/415 |
| 6,032,749 A | * | 3/2000 | Bongers-Ambrosius et al. .................... 175/394 |
| 6,102,634 A | * | 8/2000 | Turner et al. ................ 408/224 |
| 6,129,162 A | * | 10/2000 | Hauptmann ................. 175/394 |
| 6,145,606 A | * | 11/2000 | Haga ......................... 175/420.1 |
| 6,260,637 B1 | * | 7/2001 | Haussmann et al. ..... 175/420.1 |
| 6,283,232 B1 | * | 9/2001 | Batliner et al. ............. 175/415 |

FOREIGN PATENT DOCUMENTS

| | | | |
|---|---|---|---|
| EP | 0 441 302 | 8/1991 | |
| EP | 0 452 255 | 10/1991 | |
| WO | WO 85/02442 A1 | * 6/1985 | ........... E21B/10/38 |

* cited by examiner

Primary Examiner—David Bagnell
Assistant Examiner—Jennifer H Gay
(74) Attorney, Agent, or Firm—Schiff Hardin & Waite

(57) ABSTRACT

Drills, particularly rock drills, with a chisel shank and a drill head with at least one drill bit or tool bit on a face pointing in a feed direction have the tool bit formed of at least one cutting edge provided on the face side between a rake surface and a free surface with the rake surface being in the direction of rotation of the drill and being ahead of the cutting edge. The free surface has at least a portion which extends into the drill bit over at least one sub-area to form a concave depression.

25 Claims, 7 Drawing Sheets

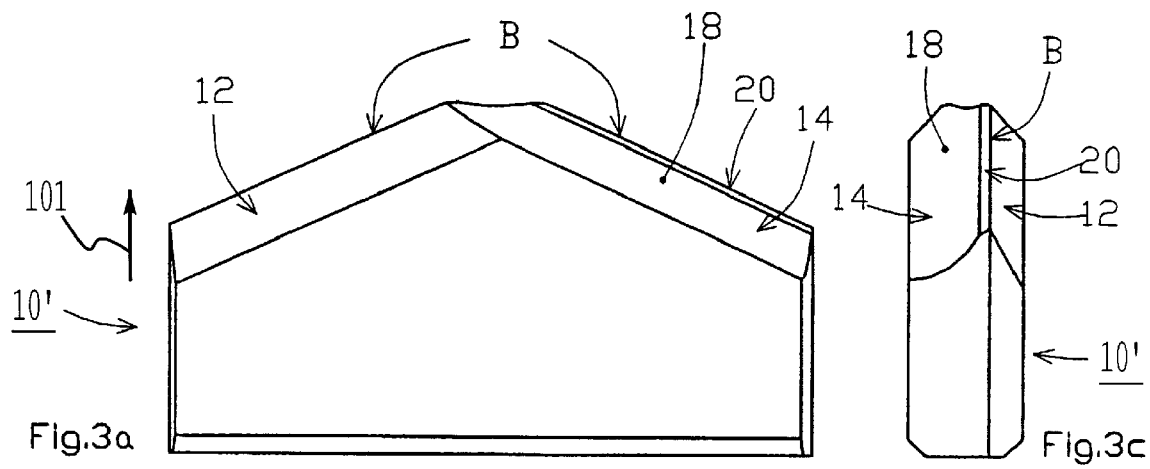
Fig.3a
Fig.3c
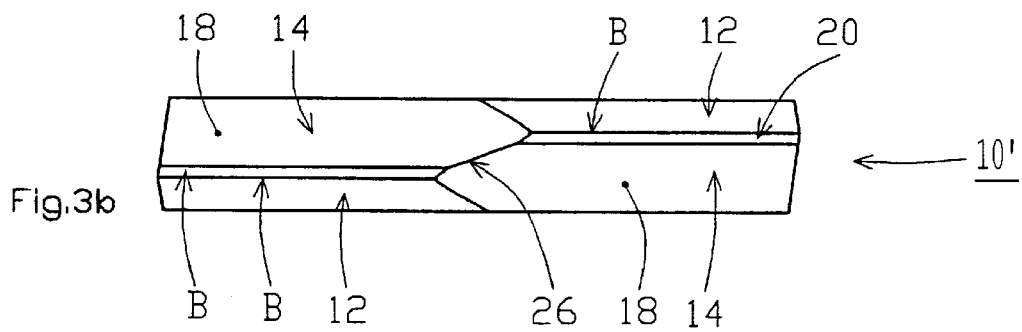
Fig.3b
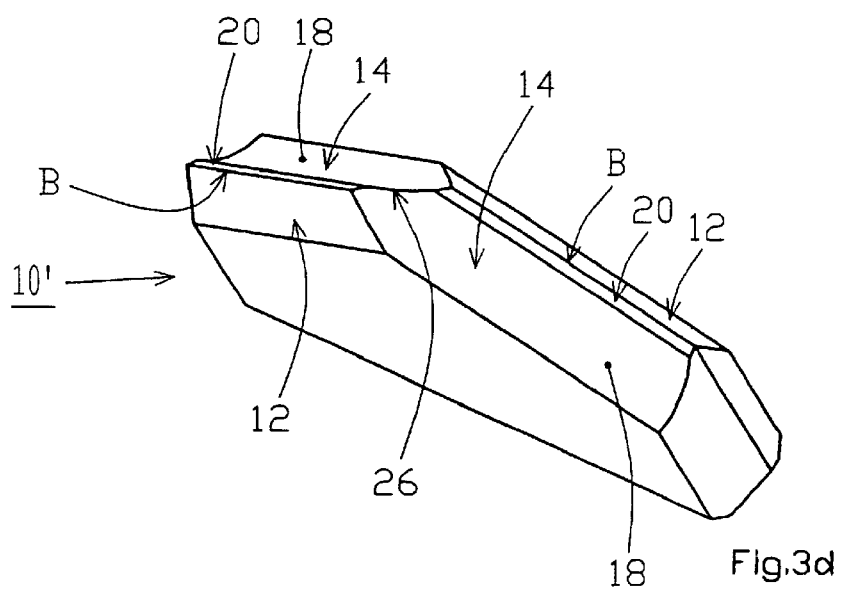
Fig.3d

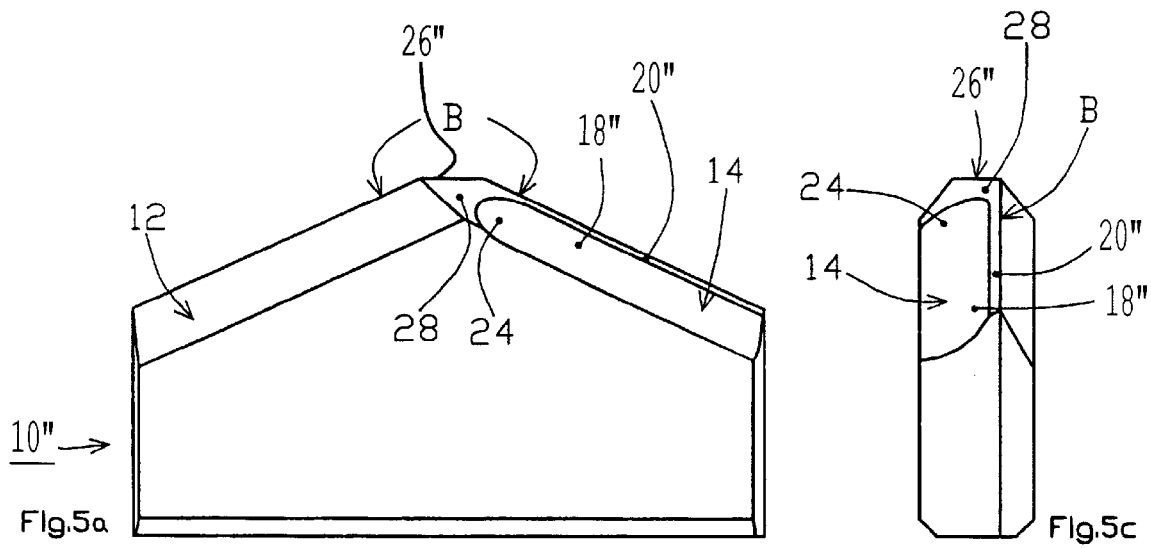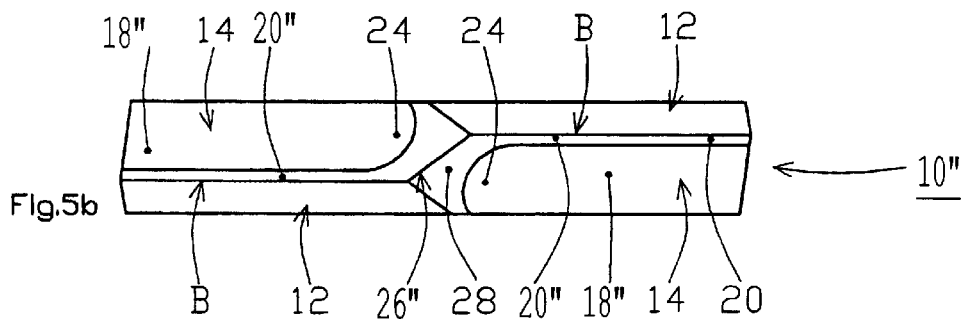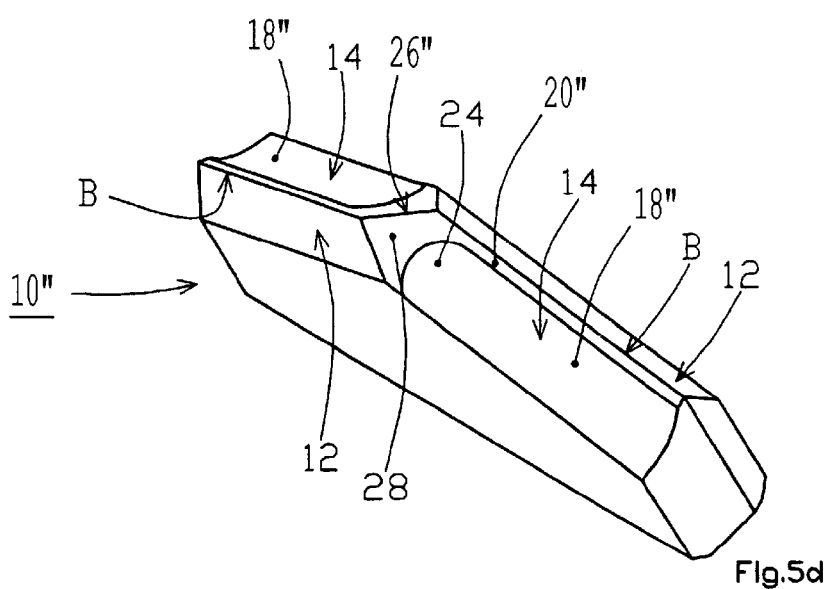

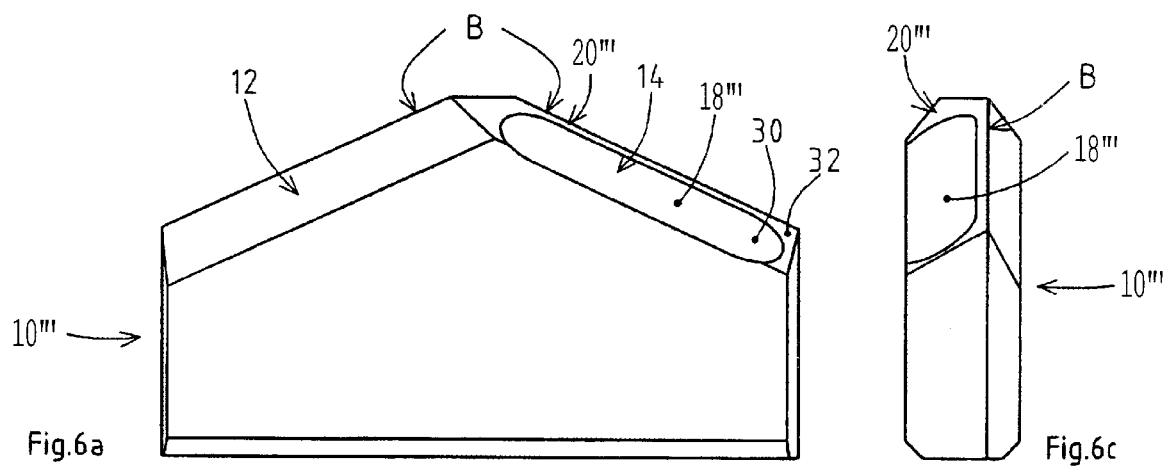
Fig.6a
Fig.6c
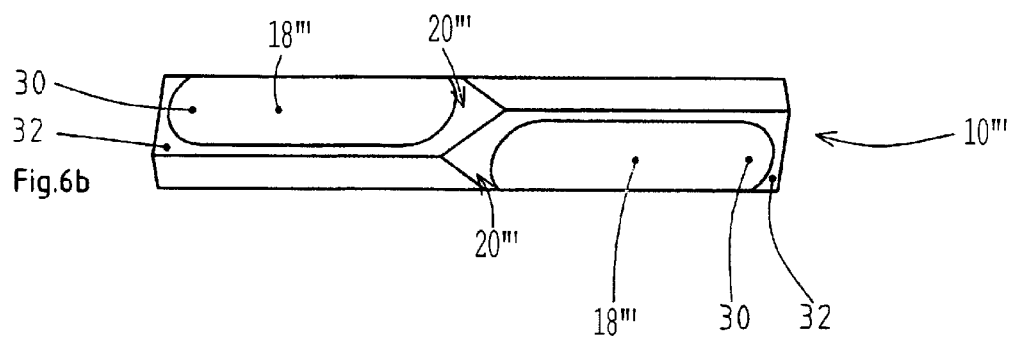
Fig.6b
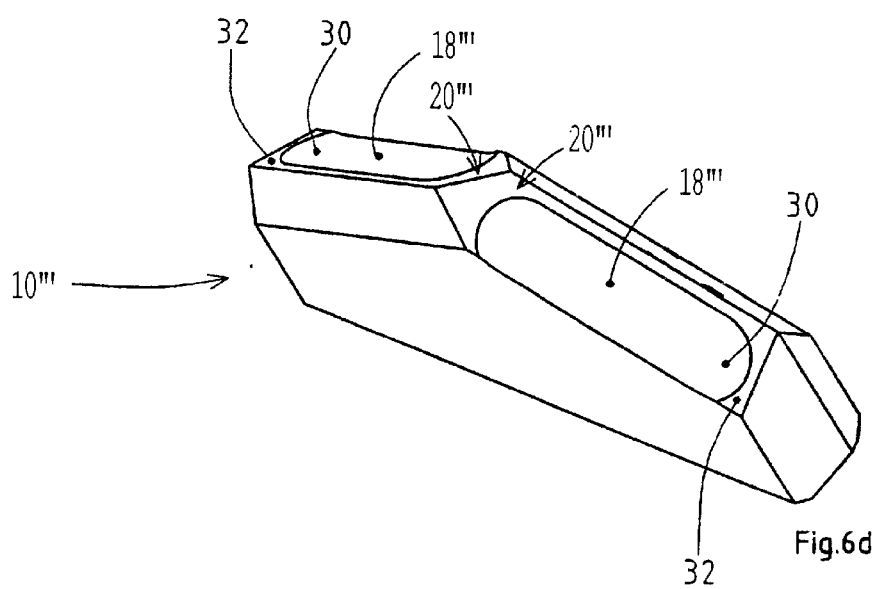
Fig.6d

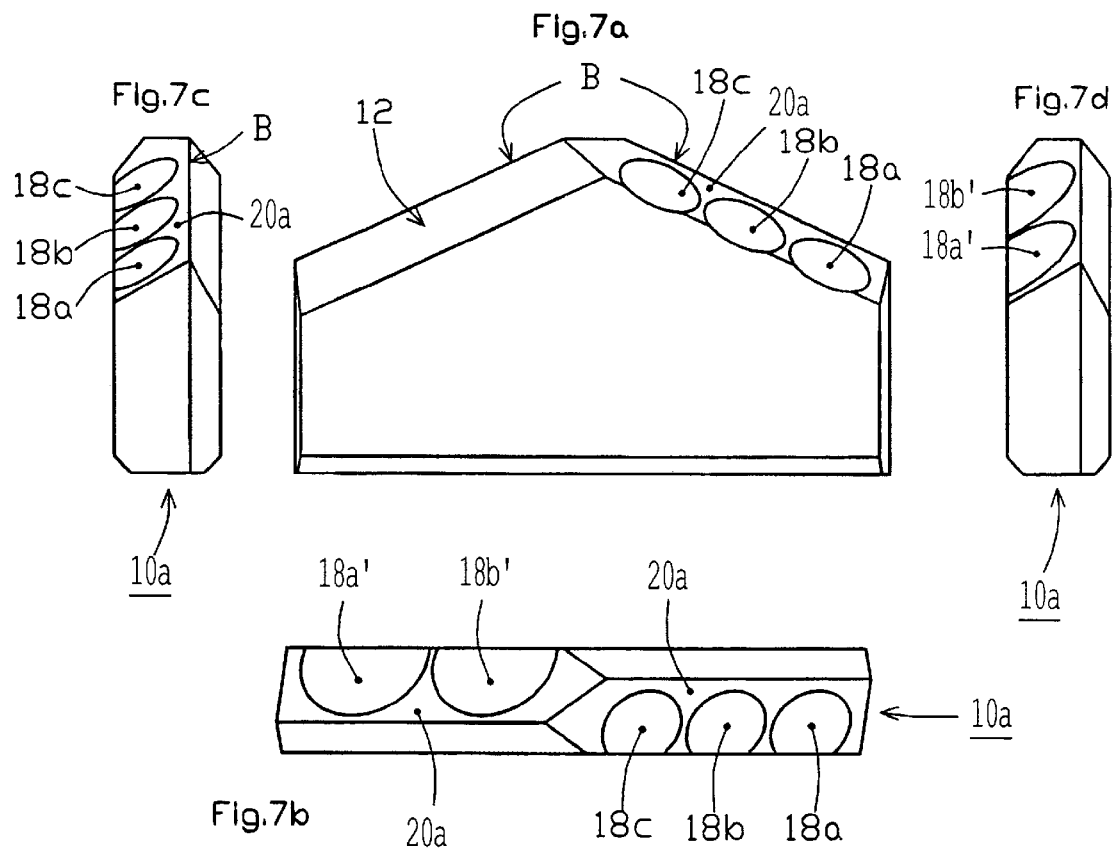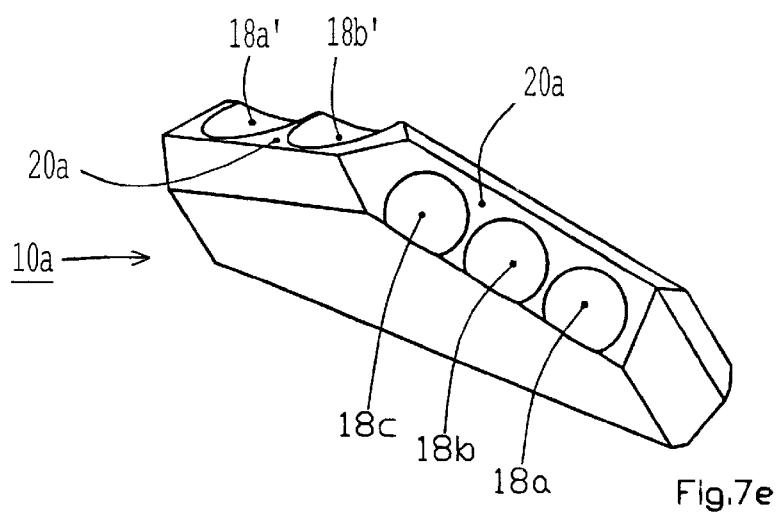

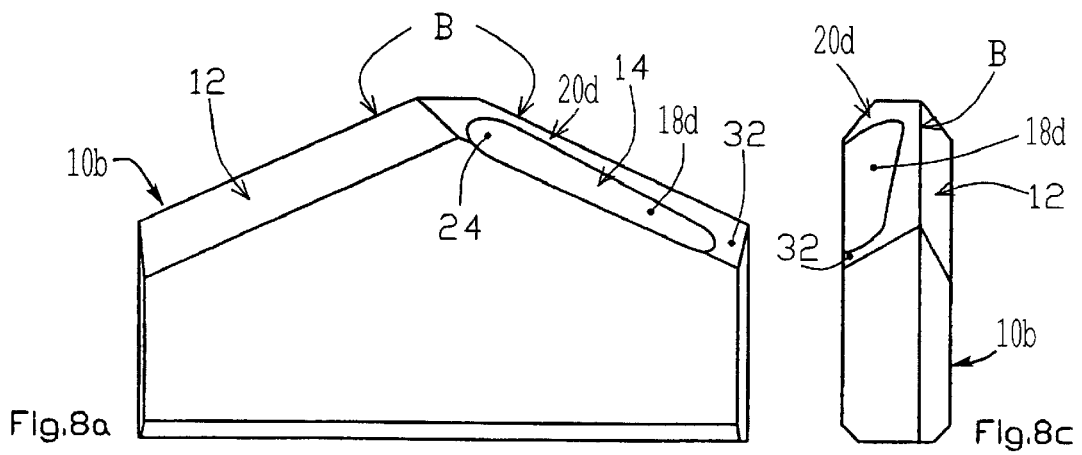
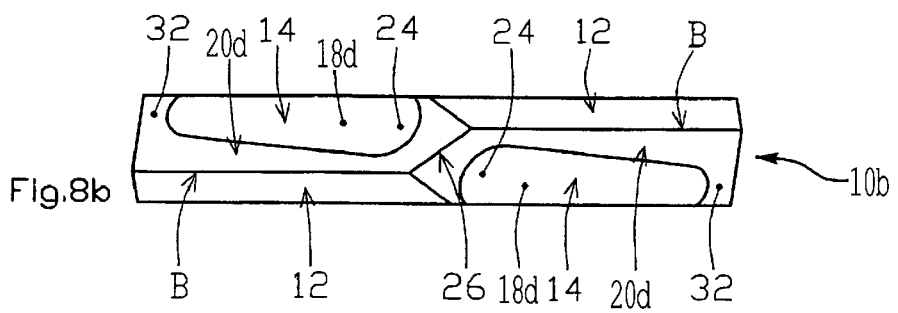
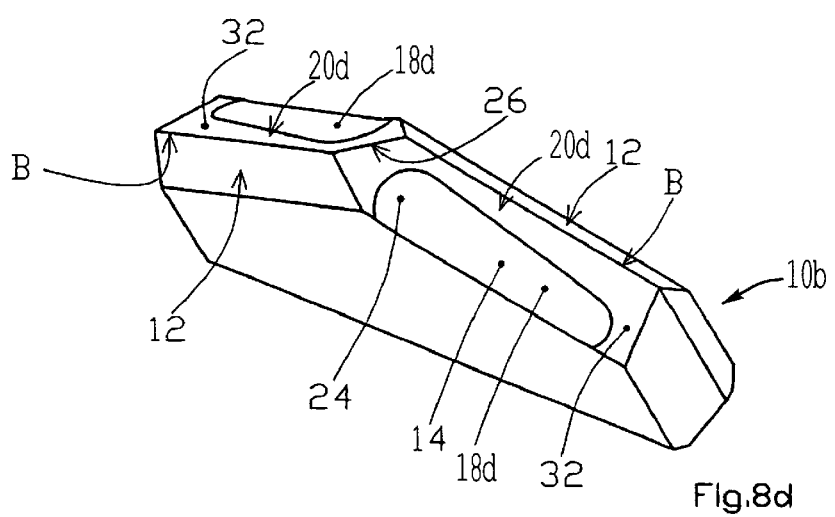

ROCK DRILL

BACKGROUND OF THE INVENTION

The present invention is directed to a drill particularly a rock drill with a chisel shank and a drill head which has at least one drill bit on a face side pointing in the feed direction. The drill bit comprises at least one cutting edge between a rake surface and a free surface with the rake surface extending before the cutting edge in the direction of rotation of the drill.

European patent application EP 0 452 255 A2 discloses such a drill. The free surface of the drill bit is planar. However, the practical utilization of the drill has shown that the drill feed is unsatisfactory.

SUMMARY OF THE INVENTION

The object of the present invention is providing a drill having a tool bit which drill has a higher drill feed.

Given a drill having a tool bit, the object is inventively achieved in that the free surface deviates from a planar surface into the tool bit over at least one sub-area and therefore has a concave portion.

It can be provided that the sub-area, in a sectional view, exhibits a curve that can be described by a progression or a polygonal course. The concave curve thereby results as a limiting case of this polygonal course. It can be particularly provided that the polygonal course or progression is composed of two straight lines.

On the other hand, it can also be provided that the sub-area, in a sectional view, is an elliptical arc. Beneficially, the sub-area, in a sectional view, is a circular arc having a radius Ri. It can be provided that the radius Ri of the circular arc is a function of the thickness S of the drill bit. In particular, it can be provided that the function is $Ri=x \cdot S$ with x being a range of 1.5 through 2.0. Preferably, x lies in the range of 1.7 through 1.8.

Advantageously, the radius Ri of the circular arc is a function of the nominal diameter D of the drill. In particular, it can be provided that the function is $Ri=y \cdot D$, with y being in a range of 0.25 through 0.60. Preferably, y is situated in a range of 0.37 through 0.45.

Moreover, it can be provided that the radius Ri is a function of the driving strength of the drill driving device provided for the utilization of the drill. Furthermore, it can be provided that the radius Ri of the circular arc is a function of the hardness of the material to be drilled with the drill. It must be pointed out at least with respect to the parameters nominal diameter, driving strength and material to be drilled that the radius Ri is not dependent on the individual parameters independently from one another. For example, when a drill having a small nominal diameter is utilized in a powerful drill driving device and soft material, a relatively large radius Ri is necessary for ensuring an optimum drilling feed. On the other hand, when a drill having a large nominal diameter is utilized in a drill driving device of low performance in hard material, a small radius Ri is advantageous.

According to another particular embodiment of the invention, it can be provided that the radius Ri of the circular arc is selected so that the tangent to the circular arc at the location of the cutting edge extends at an angle α' relative to a plane that is perpendicular to the feed direction, which angle corresponds to the rake angle γ. The tangent and the rake surface would form a symmetrical chisel form. The curve of the free surface, which is circular-arcuate instead of planar, is particularly important for increasing the stability of the cutting edge.

According to another embodiment of the invention, it can be provided that the sub-area does not include the cutting edge. Advantageously, a planar surface extends between the sub-area and the cutting edge. This further increases the stability and wearing resistance of the cutting edge.

In addition, it is provided that the planar surface can also follow radially the outer side or end of the sub-area. This assures high stability of the cutting edge in the area in which the greatest distance is traversed.

Advantageously, the planer surface extends at an angle $\alpha_1$ relative to a planar surface that is perpendicular to the feed direction. The angle $\alpha_1$ lies in a range of 10 through 30 degrees and preferably is 22.5 degrees.

Besides, it can be provided that the sub-area tapers radially towards the outside or outer end. This increases the longevity of the cutting edge particularly in the radially outer area and increases the cutting sharpness.

According to another special embodiment of the invention, it is to be provided that said sub-area is divided into at least two subdivision-areas. Advantageously, the planar surface also extends between the two subdivision-areas. This provides webs for supporting the stability of the cutting edge and the reduction of the risk of breakage.

According to another special embodiment of the invention, it can be provided that the tool bit is fashioned roof-like and has a transverse blade extending between two cutting edges with each cutting edge having a free surface and a rake surface. It is particularly provided that both free surfaces deviate from a planar surface and extend into the tool bit over at least sub-area and are therefore concave.

Beneficially, each sub-area is situated adjacent to the transverse blade. As a result thereof the two outer points of the transverse blade project higher in the feed or bore direction than the center of the blade. Therefore the friction in the center of the main tool bit is reduced vis-a-vis this transition embodiment.

Beneficially, a planar surface follows the side of each sub-area situated relative to the cutting edge. This leads—as explained above—to a further increase in the stability of the cutting edge. In addition it is also provided that the planar surface also follows the radially outer edge or end of each sub-area. This also associates with the advantages that have already been mentioned above.

Preferably each of the sub-areas is divided into at least two sub-areas. It can be particularly provided that the planar surface also extends respectively between the at least two subdivision-areas. This improves the stability of the cutting edge particularly with respect to larger nominal diameters or specific cutting edge loads.

Particularly preferred, the sub-area of the one side of the roof-like embodiment is divided at other locations or respectively, at another location than on the other side of the roof-like embodiment formed by the transverse blade. Other location means a radial offset. The purpose of the generated offside is to prevent a "placement" of the planar surface, which serves as free surface reinforcement in front of the face and a reduction of the bore feed.

According to another special embodiment of the invention, a transfer area can be provided on a least one side of the roof-like fashioning forming the transverse blade between the transverse blade and the adjacent sub-area.

It can be particularly provided that this transfer area, toward the transverse blade, passes over into a planar surface.

A transfer area that passes over into a planar surface can also be provided on the radially outer side or end of the sub-area or, respectively, of each sub-area.

Finally, it can be provided that the rake surface or, respectively, each rake surface is planar or concave or convex over at least one sub-area.

The invention is based on the surprising knowledge that a better chisel effect is achieved by means of a specific design of the free surface, whereby this design results in a higher drill feed particularly with respect to rock drills, since, with respect to rock drills, particularly with respect to hammer drills, there is no constant dependency between the bore feed in millimeters per revolution and the number of revolutions due to the pneumatic impact characteristics and conditions. However, the advantages also generally take effect with respect to drills whereby they become particularly effective with respect to drills that are utilized in drilling tools having a higher bore feed. The better chisel effect supplies a higher cutting rate and therefore a higher drilling speed in millimeters per minute.

According to the special embodiments of the invention, as a result of the planar surfaces in the area of the cutting edge and of the planar surfaces for dividing the sub-areas, in which the free surface deviates from a planar surface extending into the tool bit or is a concave depression, the stability of the cutting edge and therefore the service life with respect the inventive drill can be at least made equal or even can be improved compared to traditional drills given a higher bore feed.

Other advantages and features are apparent from the following descriptions of preferred embodiments, the drawings and claims.

BRIEF DESCRIPTION OF THE DRAWINGS

FIGS. 3a–3d are views of a second special embodiment of the invention with FIG. 3a being a side view, FIG. 3b being a plan view, FIG. 3c being an end view and FIG. 3d being a perspective view obliquely from above;

FIGS. 5a–5d include a side view, a plan view, an end view and a perspective view obliquely from above of a third special embodiment of the invention;

FIGS. 6a–6d include a side view, a plan view, an end view and a perspective view obliquely from above of a fourth special embodiment of the invention;

FIGS. 7a–7e include a side view, a plan view, an end view of the right end of FIG. 7a, an end view of the left end of FIG. 7a and a perspective view obliquely from above of a fifth special embodiment of the invention; and FIGS. 8a–8d include a side view, a plan view, an end view and a perspective view obliquely from above of a sixth special embodiment of the invention.

DESCRIPTION OF THE PREFERRED EMBODIMENTS

Figure 1:
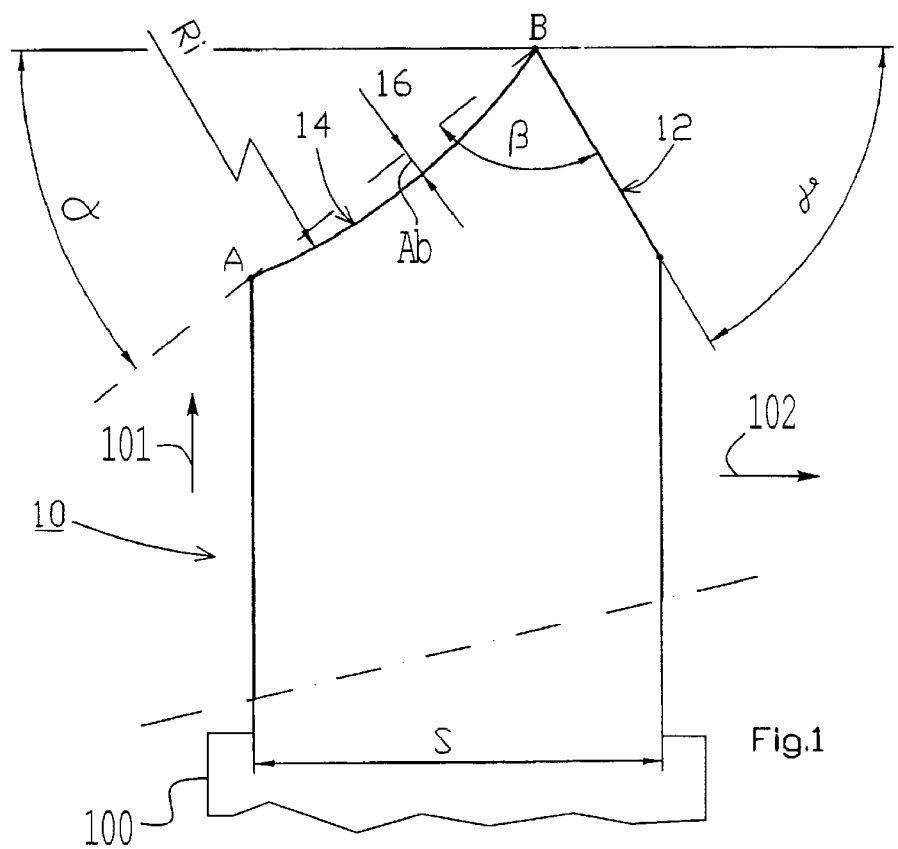
FIG. 1 is a sectional view through a drill bit of the drill according to a first special embodiment of the invention.

The principles of present invention are particularly useful when incorporated in a tool or drill bit 10 of a drill which is illustrated in profile according to the first special embodiment of the invention. The drill bit 10 is attached to a drill head 100 of a drill with a chisel shank on the face side of the drill pointing in the feed direction, which is indicated by arrow 101, and has a cutting edge B arranged at its face side between a rake surface 12 and a free surface 14 which rake surface 12 is arranged in a rotational direction, which is indicated by arrow 102, of the drill in front of the cutting edge B, while the free surface 14 follows the cutting edge B in a rotational direction 102 of the drill. In contrast to a traditional drill, wherein the free surface as is shown by means of a broken line AB, is planar and therefore would result in the free angles $\alpha$, wedge angle $\beta$ and the rake angle $\gamma$ of FIG. 1, the free surface 14 in profile has the shape of a circular arc with the radius Ri.

The tool bit 10 exhibits a thickness S. The radius Ri is selected so that the maximal deviation 16 also referred to as Ab from the planar surface of the broken line AB, as a function of the thickness S is for example Ab=z·S. This optimum deviation allows a higher drill speed to be achieved in millimeters per minute feed. A deviation Ab of 0.14 mm has proven to be optimal with respect to a nominal diameter D of the inventive drill of 8 mm and a thickness S of the drill bit of 2 mm.

This corresponds to a value of 0.07 for the factor z. The factor z should be situated within the range of 0.04 through 0.12. There is the following relationship between the deviation and the radius Ri wherein $$Ri = \frac{Ab}{w}$$

with w in the range of 0.02 through 0.06 and preferably 0.034 through 0.046.

Figure 2:
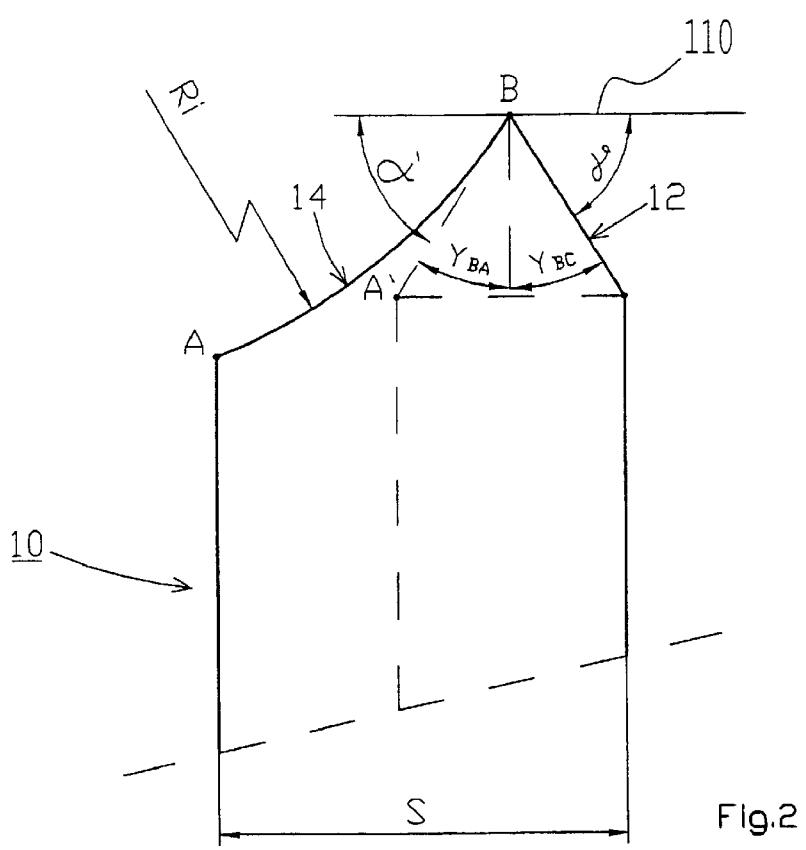
FIG. 2 is a sectional view with details regarding the selection of the radius Ri shown in FIG. 1.

The radius Ri of the circular arc of the free surface 14 shown in profile in FIG. 2 which radius Ri is selected according to the above equation is still selected so that a tangent of the circular arc at the location of the cutting edge B, which tangent is shown by a broken line A'B, extends at an angle $\alpha'$ relative to a plane 110 that is perpendicular to the feed direction 101 and the angle $\alpha'$ corresponds to the rake angle $\gamma$ of the rake surface 12. This means that the drawn angle $\gamma_{BA}$ corresponds to the drawn angle $\gamma_{BC}$. The stability of the cutting edge B is particularly increased by such a selection of the radius Ri. Given a thickness S of 2 mm and a rake angle $\gamma$ of 65°, the radius Ri is 3.5 mm.

In FIGS. 3a through 3d, a second special embodiment of the invention illustrates a tool bit 10' which is fashioned roof-like so that it has a pair of cutting edges B separated by a transverse roof-like fashioning that forms a transverse blade 26 connecting the two cutting edges B. Each of the cutting edges B has a rake surface 12 and a free surface 14, In contrast to the embodiment shown in FIGS. 1 and 2, the free surface 14 is not concave over the entire area but only over a sub-area 18 since a planar surface 20 is also present between the cutting edge B and the sub-area 18. The transverse blade 26, whose two outer points project higher in the bore direction 101 than the center, results from the free surfaces 14 being concave in the area of the transverse blade 26. This shape for the transverse blade 26 reduces the friction in the center of the main tool bit vis-a-vis the traditional embodiments.

Figure 4:
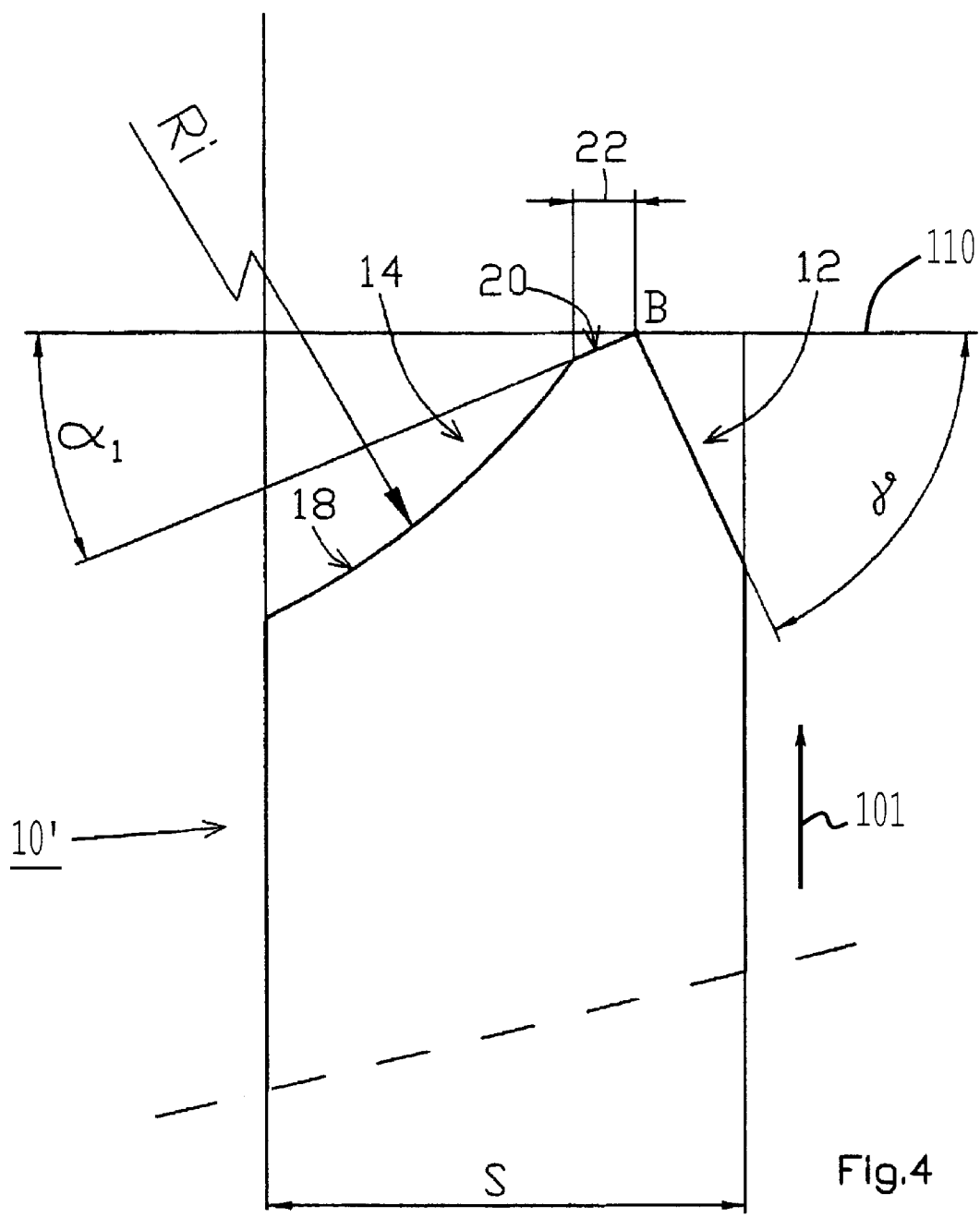
FIG. 4 is a sectional view through a drill bit of a drill of the inventive embodiment shown in FIGS. 3a through 3d.

FIG. 4 shows a profile of the tool bit 10'. The sub-area 18d does not include the cutting edge B. A planar surface 20 with a projection length 22 extends between the sub-area 18 and the cutting edge B. The planar surface 20 extends at an angle $\alpha_1$ relative to a plane 110 that is perpendicular to the feed direction 101 at an angle of 22.5°. Given a thickness S of the tool bit 10' of 2 mm, the projection length of the surface 20 in the bore feed direction 101 is 0.25 mm, the radius Ri is 3.5 mm and wedge angle $\gamma$ is 65°.

FIGS. 5a through 5d, a third embodiment of the drill bit is shown by the drill bit 10" which is fashioned roof-like and has a transverse blade 26″ connecting the two cutting edges B. Each of the cutting edges B have a rake surface 12 and a free surface 14. The drill bit 10″ differs from the drill bit 10′ of FIGS. 3a through 3d in that the free surface 14 on each side is only concave over a sub-area and it has a transfer area 24 provided on both sides of the roof-like fashioning which forms the transverse blade 26″. Thus, the transfer area 24 is adjacent to sub-area 18″ and passes over into a planar surface 28 which merges into the planar surface 20″. The planar surface 20″ serves a purpose of increasing the stability of the cutting edge B.

The drill bit 10′″ of in FIGS. 6a through 6d differs from the drill bit 10″ of FIGS. 5a through 5d in that a transfer area 30 is additionally provided on the radial outer side end of each of the sub-areas 18′″ which pass into a planar surface 32 which represents an extension of the planar surface 20′″. For reasons of clarity, only the deviations vis-a-vis the embodiment shown in FIGS. 5a through 5d are essentially provided with reference characters. The planar surfaces 32 serve as webs for further supporting the stability of the cutting edge B and for the further reducing of the risk of breakage in the area of the largest circumferential speed of the tool bit.

The tool bit 10a of FIGS. 7a through 7e essentially differs from the tool bit 10′″ of FIGS. 6a through 6d in that the sub-areas are divided into subdivisional areas 18a, 18b, 18c and 18a′ and 18b′. The subdividing occurs by the planar surface 20a which extends between the subdivisions 18a, 18b, 18c, 18a′ and 18b′ in this embodiment. Thus the planar surface 20a further supports the stability of each cutting edge B and reduces the risk of breakage particularly with respect to drills having larger nominal diameters or specific cutting edge loads. The sub-areas 18 on the two sides of the roof-like fashioning of the tool bit 10a are divided into three subdivision areas 18a, 18b and 18c on one side and into two subdivision areas 18a′ and 18b′ on the other side so that the planar surface 20a extending between the subdivision-areas is situated at different radial positions in order to prevent the planar surface 20a from being placed following one another in a radial direction during rotation of the bit and so that the bore feed is not stopped. For reasons of clarity, merely the components representing a difference vis-a-vis the drill bit of FIGS. 6a through 6d are essentially provided with reference characters.

Finally, the embodiment of the drill bit 10b shown in FIGS. 8a through 8d differs from the drill bit 10′″ shown in FIGS. 6a through 6d in that the sub-area 18d tapers radially to the outside, so that the planar surface 20d is reinforced. It is thereby achieved that the longevity of the cutting edge B, which is normally less due to the higher speeds in the radially outer areas or ends and that the cutting sharpness is thereby increased.

Although minor modifications may be suggested by those versed in the art, it should be understood that we wish to embody within the scope of the patent granted hereon all such modifications as reasonably and properly come within the scope of our contribution to the art.

We claim:

1. A rock drill with a chisel shank and a drill head which has at least one tool bit on a face side pointing in a feed direction, the tool bit comprising at least one cutting edge provided on the face side between a rake surface and a free surface with the rake surface being arranged in a direction of rotation of the drill in front of the cutting edge, the improvement comprising the free surface having at least a sub-area deviating from a planar surface and extending into the tool bit to form a concave depression, the sub-area in profile being a circular arc having a radius Ri, and the radius Ri of the circular arc being a function of the thickness S of the tool bit.

2. A drill according to claim 1, wherein the function is $Ri = x \cdot S$, with x being in the range of 1.5 through 2.0.

3. A drill according to claim 2, wherein x is in the range of 1.7 to 1.8.

4. A rock drill with a chisel shank and a drill head which has at least one tool bit on a face side pointing in a feed direction, the tool bit comprising at least one cutting edge provided on the face side between a rake surface and a free surface with the rake surface being arranged in a direction of rotation of the drill in front of the cutting edge, the improvement comprising the free surface having at least a sub-area deviating from a planar surface and extending into the tool bit to form a concave depression, the sub-area in profile being a circular arc having a radius Ri, and the radius Ri of the circular arc being a function of the nominal diameter D of the drill.

5. A drill according to claim 4, wherein the function is $Ri = y \cdot D$, with y being in a range of 0.25 through 0.60.

6. A drill according to claim 5, wherein y is in a range of 0.37 through 0.45.

7. A rock drill with a chisel shank and a drill head which has at least one tool bit on a face side pointing in a feed direction, the tool bit comprising at least one cutting edge provided on the face side between a rake surface and a free surface with the rake surface being arranged in a direction of rotation of the drill in front of the cutting edge, the improvement comprising the free surface having at least a sub-area deviating from a planar surface and extending into the tool bit to form a concave depression, the sub-area in profile being a circular arc having a radius Ri, and the radius Ri of the circular arc being a function of the driving power of a drill driving device provided for the utilization of the drill.

8. A rock drill with a chisel shank and a drill head which has at least one tool bit on a face side pointing in a feed direction, the tool bit comprising at least one cutting edge provided on the face side between a rake surface and a free surface with the rake surface being arranged in a direction of rotation of the drill in front of the cutting edge, the improvement comprising the free surface having at least a sub-area deviating from a planar surface and extending into the tool bit to form a concave depression, the sub-area in profile being a circular arc having a radius Ri, and the radius Ri of the circular arc being a function of the hardness of the material to be drilled with the drill.

9. A rock drill with a chisel shank and a drill head which has at least one tool bit on a face side pointing in a feed direction, the tool bit comprising at least one cutting edge provided on the face side between a rake surface and a free surface with the rake surface being arranged in a direction of rotation of the drill in front of the cutting edge, the improvement comprising the free surface having at least a sub-area deviating from a planar surface and extending into the tool bit to form a concave depression, and the sub-area not including the cutting edge.

10. A drill according to claim 9, a planar surface extends between the sub-area and to the cutting edge.

11. A drill according to claim 10, wherein the planar surface also follows the radially outer edge of the sub-area.

12. A drill according to claim 10, wherein the planar surface extends at an angle relative to a plane that is perpendicular to the feed direction and the angle has a range of 10 to 30 degrees.

13. A drill according to claim 12, wherein the angle is 22.5 degrees.

14. A drill according to claim 9, wherein the sub-area is divided into at least two subdivision-areas.

15. A drill according to claim 14, wherein a planar surface extends between the at least two subdivision-areas.

16. A rock drill with a chisel shank and a drill head which has at least one tool bit on a face side pointing in a feed direction, the tool bit comprising at least one cutting edge provided on the face side between a rake surface and a free surface with the rake surface being arranged in a direction of rotation of the drill in front of the cutting edge, the improvement comprising the free surface having at least a sub-area deviating from a planar surface and extending into the tool bit to form a concave depression, the tool bit being fashioned roof-like having a transverse blade interconnecting two cutting edges with each cutting edge having a rake surface and a free surface, and each of the free surfaces having at least a sub-area deviating from the planar surface into the tool bit to form a concave surface.

17. A drill according to claim 16, wherein each sub-area is situated adjacent to the transverse blade.

18. A drill according to claim 16, which includes a planar surface adjacent to a side of each sub-area and situated adjacent to the cutting edge.

19. A drill according to claim 18, wherein the planar surface also follows the radially outer edge of each sub-area.

20. A drill according to claim 16, wherein each sub-area is divided into at least two subdivision-areas.

21. A drill according to claim 20, wherein a planar surface also extends between the at least two subdivision-areas.

22. A drill according to claim 20, wherein the sub-area is divided on one side of the transverse blade in one set of radial locations and on the other side of the transverse blade at another set of radial locations so that the subdivision-areas on one side are at a different radial spacing from the transverse blade than a radial spacing on the other side.

23. A drill according to claim 16, which includes at least one transfer area being provided on at least one side of the roof-like fashioning between the transverse blade and the adjacent sub-area.

24. A drill according to claim 23, wherein the transfer area that extends toward the transverse blade passes into a planar surface.

25. A drill according to claim 16, wherein a transfer area is provided on a radially outer end of the sub-area and extends into a planar surface.

* * * * *